(12) United States Patent
Nishii et al.

(10) Patent No.: US 6,568,183 B2
(45) Date of Patent: *May 27, 2003

(54) HYDRAULIC BRAKE DEVICE FOR A VEHICLE

(75) Inventors: Michiharu Nishii, Toyota (JP); Satoshi Ishida, Chiryu (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 53 days.

This patent is subject to a terminal disclaimer.

(21) Appl. No.: 09/865,552

(22) Filed: May 29, 2001

(65) Prior Publication Data

US 2001/0049940 A1 Dec. 13, 2001

(30) Foreign Application Priority Data

May 30, 2000 (JP) .......................... 2000-161249

(51) Int. Cl.[7] .............................................. B60T 13/20
(52) U.S. Cl. ........................................................ 60/550
(58) Field of Search ........................... 60/550, 574, 577, 60/575, 576

(56) References Cited

U.S. PATENT DOCUMENTS

| | | | | |
|---|---|---|---|---|
| 3,188,796 A | * | 6/1965 | French et al. ................. | 60/548 |
| 3,910,048 A | | 10/1975 | Gardner | |
| 3,972,191 A | * | 8/1976 | Grabb .......................... | 60/553 |
| 4,417,445 A | * | 11/1983 | Furuta .......................... | 60/554 |
| 4,942,738 A | * | 7/1990 | Kaub .......................... | 60/550 |
| 5,970,710 A | | 10/1999 | Dieringer | |

FOREIGN PATENT DOCUMENTS

| | | |
|---|---|---|
| DE | 33 19 465 A1 | 11/1984 |
| DE | 100 55 715 A1 | 5/2001 |
| GB | 2 140 519 A | 11/1984 |

* cited by examiner

Primary Examiner—Edward K. Look
Assistant Examiner—Igor Kershteyn
(74) Attorney, Agent, or Firm—Burns, Doane, Swecker & Mathis, LLP

(57) ABSTRACT

A hydraulic brake device for a vehicle includes a master cylinder having a master piston and an auxiliary piston for assisting the actuation of the master piston. The vehicle hydraulic brake device also includes a first valve mechanism for hydraulically closing a first pressure transmitting chamber when the actuation of the master piston is assisted by an assisting device, a second valve mechanism for hydraulically closing a second pressure transmitting chamber after the pressure in the first pressure transmitting chamber reaches a predetermined value, and for hydraulically connecting the second pressure transmitting chamber with the first pressure transmitting chamber when the master piston is not actuated by the assisting device.

20 Claims, 7 Drawing Sheets brake pedal depressing force

HYDRAULIC BRAKE DEVICE FOR A VEHICLE

This application is based on and claims priority under 35 U.S.C. §119 with respect to Japanese Patent Application 2000-161249 filed on May 30, 2000, the entire content of which is incorporated herein by reference.

FIELD OF THE INVENTION

This invention generally relates to a hydraulic brake device. More particularly, the present invention pertains to hydraulic brake device in a vehicle that is provided with an assisting device for assisting master cylinder actuation in response to brake pedal operation.

BACKGROUND OF THE INVENTION

A known negative pressure booster (servo motor) for use in a power braking system is disclosed in a U.S. Pat. No. 3,910,048 issued in 1975. The servo motor includes a pressure ratio changer in which a first piston and a second piston supply a master cylinder with an operative force. The first piston is connected with a wall within the servo motor which is moved by a pressure differential across the wall. The second piston is concentrically positioned within the first piston to transmit an input force which operates a control valve to produce the pressure differential and also operates a hydraulic lock valve located within a master cylinder. As the first piston and the second piston move together in response to movement of the wall, hydraulic fluid flows into a locking chamber past the lock valve. When the maximum force output capable of being generated by the pressure differential is reached, the simultaneous movement of the first and the second pistons will cease. Further manual force input from the operator will move the second piston within the first piston to close the lock valve and hold the hydraulic fluid within the locking chamber to prevent the first piston from moving.

More specifically, as the first and the second pistons move forward, hydraulic pressure develops in pressure chambers of the master cylinder. The output from the first and the second pistons follows a line (line 188 shown in FIG. 3 of U.S. Pat. No. 3,910,048) until the entire second chamber in the servo motor contains air at atmospheric pressure. At a particular point (point 190 in FIG. 3 of the aforementioned patent), the input force from the pedal is transmitted through a plunger and a sleeve into the second piston (shown in FIG. 1 of the aforementioned patent). This input force causes the second piston to independently move and permits a valve spring to close a hydraulic passage. As the second piston moves further, the output will follows a line (line 192 shown in FIG. 3 of the patent). In the event a negative pressure is unavailable at the intake manifold, an input force applied to the brake pedal initially moves the second piston within the first piston to permit immediate closure of the hydraulic passage by the lock valve. The output from the second piston follows a line (line 196 shown in FIG. 3 of the patent). This line exhibits a higher output than the line 195 where both pistons are moved during a no power condition.

The servo motor for use in a power braking system disclosed in the aforementioned patent is configured to provide an output following the line 192 in FIG. 3 of the patent by enclosing the increased hydraulic pressure in the locking chamber in response to the movement of the second piston within the first piston after reaching the point 190. Even when the servo motor fails (e.g., a negative pressure is unavailable), the output can follow the line 196. To provide an output following the line, as shown in FIG. 1 of the patent, the servo motor serving as an assisting device needs to be configured for assuring a sufficient relative amount of movement of the second piston relative to the first piston. Accordingly, the structure of the known servo motor requires substantial change and the increase of the cost is unavoidable. Similarly, when the braking force is further increased after the assisting limit by the servo motor, the structure of the known servo motor still needs to be changed.

A need thus exists for an improved hydraulic brake device for a vehicle having an assisting device that drives a master cylinder in response to a brake pedal operation.

It would thus be desirable to provide a hydraulic brake device for a vehicle that is able to assure a proper input-output performance not only when the assisting device such as a brake booster fails, but also after reaching the assisting limit, with minimal structural changes in the assisting device.

SUMMARY OF THE INVENTION

According to one aspect of the present invention, the hydraulic brake device for a vehicle includes a master cylinder having a master piston for supplying brake pressure to a wheel cylinder in response to a brake pedal depression, an assisting device for assisting the actuation of the master piston in response to the brake pedal depression, and an auxiliary piston provided rearward of the master piston and including a large diameter portion having an effective cross-sectional area larger than that of the master piston and a small diameter portion provided in front of the large diameter portion and having an effective cross-sectional area smaller than that of the master piston. The auxiliary piston is operatively associated with the assisting device. A first pressure transmitting chamber is provided between the large diameter portion and the master piston, and a second pressure transmitting chamber is provided between the small diameter portion and the master piston. A first valve mechanism hydraulically closes the first pressure transmitting chamber when the actuation of the master piston is assisted by the assisting device through the auxiliary piston and establishes hydraulic communication between the first pressure transmitting chamber and a reservoir of the master cylinder when the master piston is not actuated by the assisting device. A second valve mechanism hydraulically connects the second pressure transmitting chamber with the first pressure transmitting chamber to increase the brake pressure when the actuation of the master piston is assisted by the assisting device through the auxiliary piston, hydraulically closes the second pressure transmitting chamber after the pressure in the first pressure transmitting chamber reaches a predetermined value, and hydraulically connects the second pressure transmitting chamber with the first pressure transmitting chamber when the master piston is not actuated by the assisting device. The predetermined pressure is preferably set to the pressure immediately before the assisting limit by the assisting device.

When the master piston is assisted through the auxiliary piston by the assisting device, the first pressure transmitting chamber is hydraulically sealed by the first valve mechanism. Then the auxiliary piston and the master piston are hydraulically connected. The brake pressure is increased by connecting the second pressure transmitting chamber with the first pressure transmitting chamber by the second valve device. After the pressure in the first transmitting chamber reaches the predetermined pressure, the second pressure transmitting chamber can be hydraulically sealed. When the assisting is not carried out by the assisting device, the pressure in the first pressure transmitting chamber becomes the atmospheric pressure by being connected with the reservoir by the first valve mechanism. The pressure in the second pressure transmitting chamber is decreased to atmospheric pressure by being connected with the first transmitting chamber by the second valve mechanism. Accordingly, the auxiliary piston and the master piston can be mechanically connected.

The hydraulic brake device further includes a first hydraulic passage formed in the auxiliary piston for connecting the first pressure transmitting chamber with the reservoir. The first valve mechanism includes a first valve seat disposed in the first hydraulic passage, a first valve body adapted to be seated on or separated from the first valve seat for closing or opening the first hydraulic passage, a first biasing means always biasing the first valve body toward the first valve seat, and a brake input transmitting member for driving the first valve body in response to the brake pedal depression when the assisting device is not operated.

The hydraulic brake device also includes a second hydraulic passage formed in the auxiliary piston for connecting the second pressure transmitting chamber with the first pressure transmitting chamber. The second valve mechanism includes a second valve seat disposed in the second hydraulic passage, a second valve body to be seated on or separated from the second valve seat for closing or opening the second hydraulic passage, a second biasing means always biasing the second valve body toward the second valve seat, a pressure responsive member for moving the second valve body to be separated from the second valve seat in response to the pressure in the first pressure transmitting chamber, and a third biasing means for always biasing the pressure responsive valve toward the second valve body with a biasing force larger than that of the second biasing means.

The assisting device can be in the form of a negative pressure booster serving as a negative pressure assisting device or a hydraulic pressure booster serving as a hydraulic pressure assisting device. Elastic members are provided between the auxiliary piston or the master piston and the assisting device and the brake input transmitting member is desirably arranged to connect with the brake pedal without being in contact with the elastic members.

According to another aspect of the invention, a hydraulic brake device for a vehicle includes a master cylinder with a master piston for supplying brake pressure to a wheel cylinder in response to depression of a brake pedal, an assisting device for assisting actuation of the master piston in response to the depression of the brake pedal, and an auxiliary piston provided rearward of the master piston and including a larger diameter portion and a smaller diameter portion provided in front of the larger diameter portion. The auxiliary piston is operatively associated with the assisting operation of the assisting device. A first pressure transmitting chamber is located between the larger diameter portion and the master piston, and a second pressure transmitting chamber is located between the smaller diameter portion and the master piston. A first valve mechanism hydraulically closes the first pressure transmitting chamber when actuation of the master piston is assisted by the assisting device through the auxiliary piston and establishes hydraulic communication between the first pressure transmitting chamber and a reservoir when the master piston is not actuated by the assisting device. A second valve mechanism hydraulically connects the second pressure transmitting chamber with the first pressure transmitting chamber when the master piston is not actuated by the assisting device.

In accordance with another aspect of the invention, a hydraulic brake device for a vehicle includes a master cylinder having a master piston for supplying brake pressure to a wheel cylinder in response to depression of a brake pedal, an assisting device for assisting actuation of the master piston in response to the depression of the brake pedal, an auxiliary piston provided rearward of the master piston and including a larger diameter portion and a smaller diameter portion provided in front of the larger diameter portion, with the auxiliary piston being operatively associated with assisting operation of the assisting device, a first pressure transmitting chamber between the larger diameter portion and the master piston, and a second pressure transmitting chamber between the smaller diameter portion and the master piston. A first valve mechanism hydraulically closes the first pressure transmitting chamber when actuation of the master piston is assisted by the assisting device through the auxiliary piston and establishes hydraulic communication between the first pressure transmitting chamber and a reservoir when the master piston is not actuated by the assisting device. A hydraulic passage formed in the auxiliary piston connects the second pressure transmitting chamber with the first pressure transmitting chamber. A valve seat is disposed in the hydraulic passage, a valve body is adapted to be alternatively seated on and separated from the valve seat for alternatively closing and opening the hydraulic passage, and a spring always biases the valve body toward the valve seat.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 1:
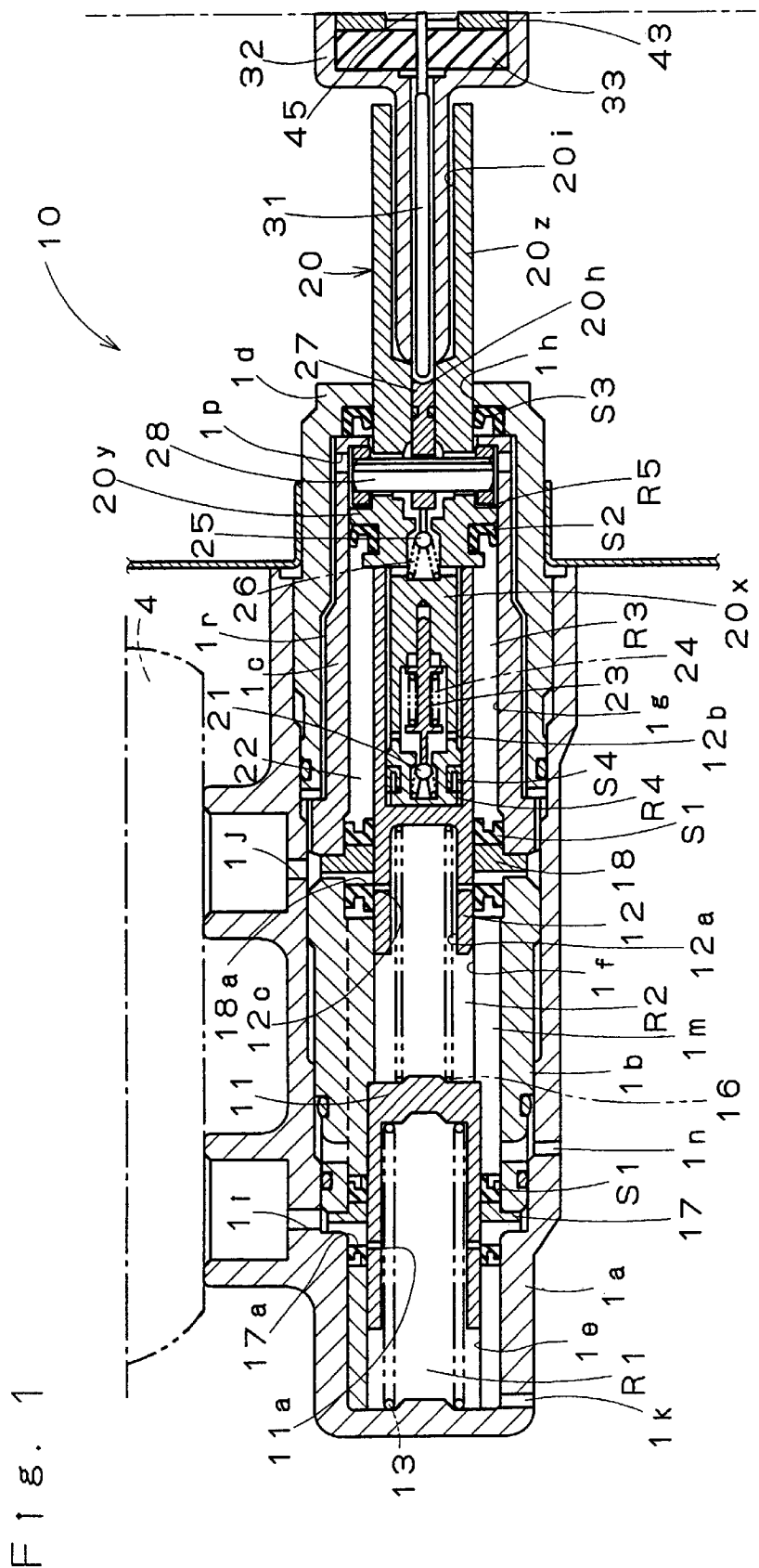
FIG. 1 is a cross-sectional view of a master cylinder portion of a hydraulic brake device according to an embodiment of the present invention.
Figure 2:
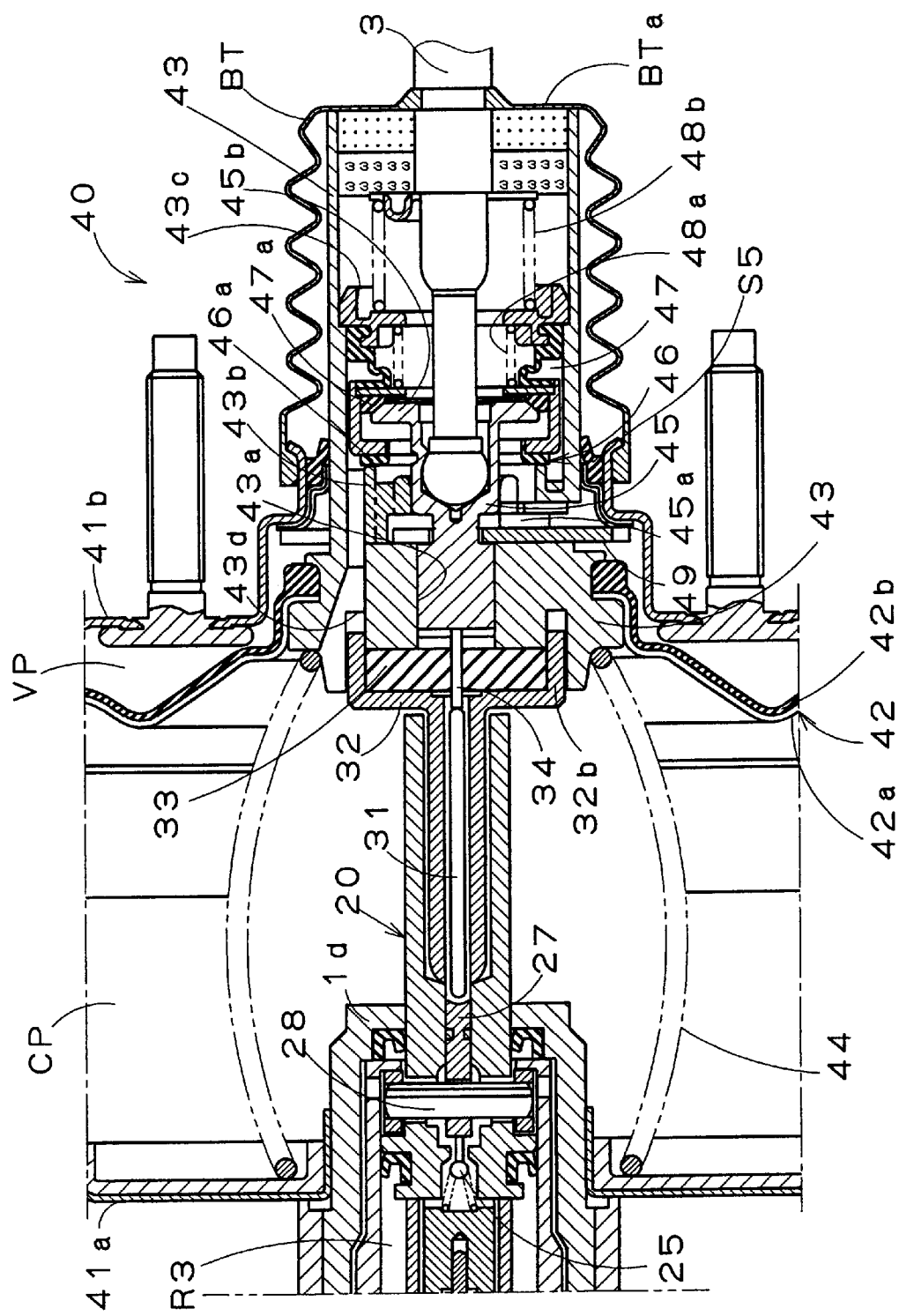
FIG. 2 is a cross-sectional view of a negative pressure booster portion of the hydraulic brake device according to the present invention.

Referring initially to FIGS. 1 and 2, the hydraulic brake device of the present invention includes a master cylinder shown in FIG. 1 and a negative pressure booster shown in FIG. 2. The hydraulic brake device is operatively associated with a brake pedal and the depressing force or operation force applied to the brake pedal is transmitted to an input rod 3 as a braking force. In response to the braking force, brake pressure is supplied from a brake master cylinder 10 under the assistance of a negative pressure booster 40. The brake pressure is supplied to each of the wheel cylinders (not shown) provided on respective wheels of the vehicle.

As shown in FIG. 1, the master cylinder 10 includes a cylinder body having a first cylinder 1a, a second cylinder 1b accommodated in the first cylinder, a third cylinder 1c, and a fourth cylinder 1d. A first piston 11 serving as a floating piston, a second piston 12 serving as a master piston and a third piston 20 serving as an auxiliary piston in the disclosed embodiment of the present invention are accommodated in series in the cylinder body. The first cylinder 1a has a bottom portion at one end (i.e., the left end in FIG. 1) and is provided with a stepped bore. The inner diameter of the stepped bore gradually increases toward the open end of the bore (i.e., the right end in FIG. 1). The second cylinder 1b possesses an approximately cylindrical shape and includes a stepped bore defined by cylinder bore portions 1e, 1f having different diameters. A plurality of axially extending grooves 1m are formed in the inner peripheral surface of the second cylinder 1b.

Both the third cylinder 1c and the fourth cylinder 1d are generally cylindrical in shape, with the fourth cylinder 1d enclosing or surrounding the outer periphery of the third cylinder 1c so that an annular hydraulic passage (hydraulic chamber) 1r is formed between the third and fourth cylinders 1c, 1d. A cylinder bore 1g having an inner diameter larger than the inner diameter of the cylinder bore portions 1e, 1f is formed in the third cylinder 1c. A port 1p connected with the hydraulic passage 1r is formed in the peripheral portion of the third cylinder 1c. A bore 1h having the same inner diameter as that of the cylinder bore 1f, but smaller than the inner diameter of the cylinder bore 1g, is formed at the bottom portion (i.e., right end) of the fourth cylinder 1d. The first cylinder 1a is provided with fluid supply ports 1i, 1j and output ports 1k, 1n. The output port 1k is connected with the cylinder bore 1e through the groove 1m and the output port in is connected with the cylinder bore 1f through the groove 1m.

An annular member 17 is arranged at the front end (i.e., left end) of the second cylinder 1b located in the first cylinder 1a. The annular member 17 has an axially extending communicating hole 17a, and cup-shaped sealing members S1 are positioned on both sides of the annular member 17. The cylinder bore 1e can communicate with the fluid supply port 1i through the communicating hole 17a.

An annular member 18 provided with an axially extending communicating hole 18a is arranged between the second cylinder 1b and the third cylinder 1c. Sealing member S1 positioned between the second cylinder 1b and the third cylinder 1c are arranged on opposite sides of the annular member 18. The cylinder bore 1f can communicate with the fluid supply port 1j through the communicating hole 18a.

The first piston 11 having a bottom portion (closed end) is accommodated in the cylinder bore 1e and is slidably supported in a fluid-tight manner by the annular member 17. A pressure chamber R1 is defined between the first cylinder 1a and the first piston 11. The second piston 12 is accommodated in the cylinder bore 1f and is slidably supported in a fluid-tight manner by the annular member 18. A pressure chamber R2 is defined between the first piston 11 and the second piston 12. Rearward movement of the first piston 11 is restricted by a step between the cylinder bore portions 1e, 1f. At the rear end position under the non-operated condition, a communicating hole 1a is formed on a skirt portion of the annular member 17 that faces the communicating hole 17a. The pressure chamber R1 is connected with a reservoir 4 through the fluid supply port 1i.

A spring 13 is disposed between the front end surface of the first cylinder 1a and the recessed base surface or bottom end of the first piston 11. The spring 13 always biases the first piston 11 in rear direction (i.e., toward the right side in FIG. 1). Each end of the second piston 12 is provided with a hollow portion 12a, 12b, with a central partition wall being formed between the two hollow portions 12a, 12b at an approximately middle portion of the second piston 12. The second piston 12 is always biased by a spring 16. Under the non-operated condition, the second piston 12 is biased by the spring 16 in the rear direction so that rear end surface of the second piston 12 contacts the front end surface of a large diameter portion 20y of the third piston 20. In this manner, the rearward movement of the second piston 12 is restricted in relation to the third piston 20.

Under the non-operated condition, because the communicating hole 12c formed on the second piston 12 faces the communicating hole 18a of the annular member 18, the pressure chamber R2 is connected to the reservoir 4 through the fluid supply port 1j. Further, a radially directed groove 12d (see FIG. 3) is formed in the rear end surface of the second piston 12 and is communicated with the hollow portion 12b of the second piston 12. As explained in more detail below, even when the second piston 12 is in contact with the front end surface of the large diameter portion 20y of the third piston 20, connection of the hydraulic passage with a hollow portion 20e (shown in FIG. 3) can be assured.

Figure 3:
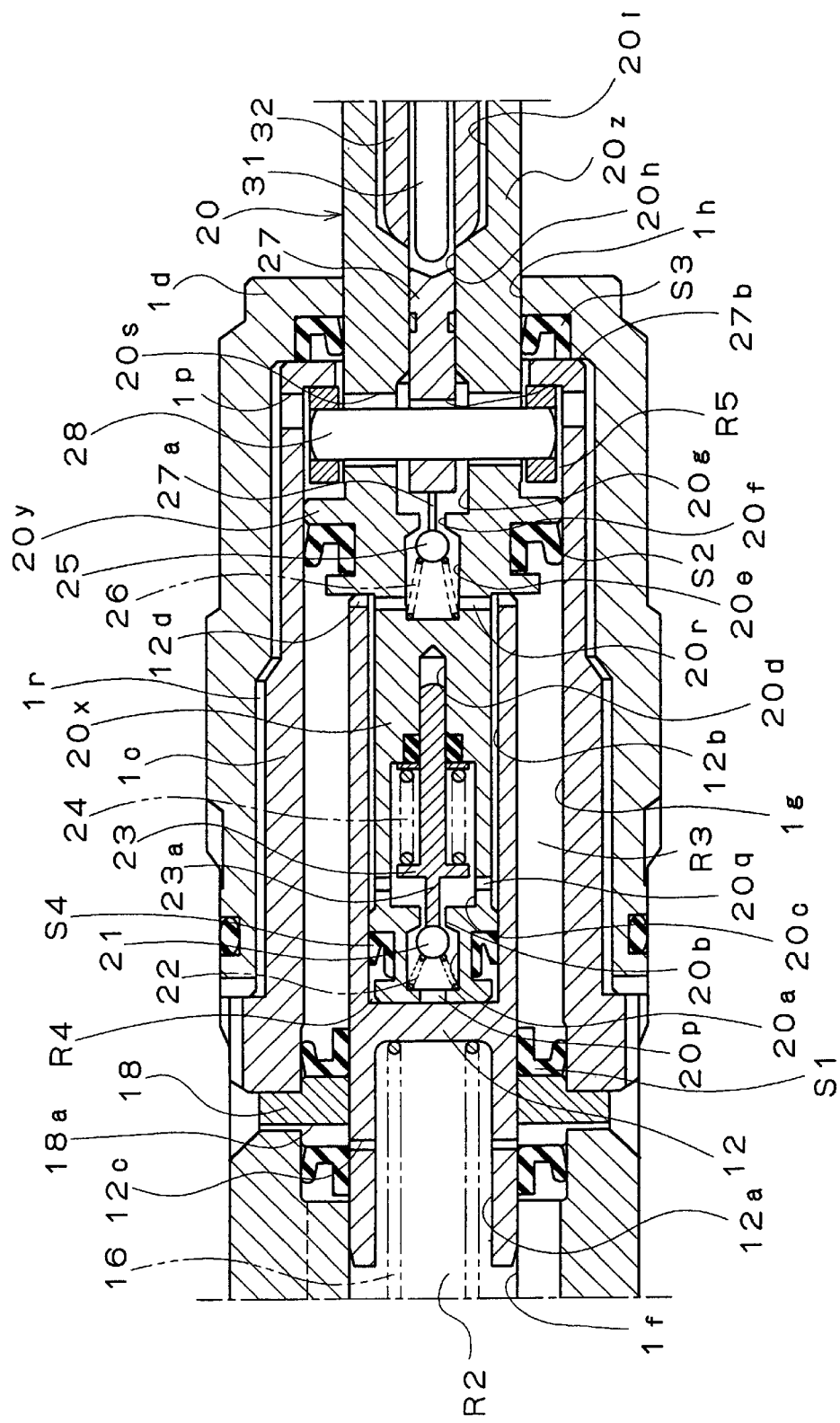
FIG. 3 is a cross-sectional view of the second and a third piston portions of the master cylinder portion of a hydraulic brake device when the brake is not operated.

As shown in more detail in FIG. 3, the third piston 20 includes a stepped cylinder body providing a small diameter portion 20x, a large diameter portion 20y, and an intermediate diameter portion 20z arranged in that order from the front of the third piston 20. The third piston 20 is also provided with nine hollow portions 20a–20i, several communicating holes 20p, 20q, 20r, and two axially elongated holes 20s.

The effective cross-sectional area of the large diameter portion 20y is larger than that of the second piston 12 which is slidably movable in the annular member 18. A cup-shaped sealing member S2 is provided in front of the large diameter portion 20y and is accommodated in a fluid-tight and slidable manner in the cylinder bore 1g. Accordingly, a first pressure transmitting chamber R3 is defined between the inner surface of the cylinder bore 1g and the outer surface of the second piston 12 and between the sealing members S1 and S2 as shown in FIG. 3.

A hydraulic chamber R5 is defined in the cylinder bore 1g rearward of the large diameter portion 20y. Further rearward of the large diameter portion 20y are formed the elongated holes 20s connected with the hollow portion 20g toward the top and bottom as shown in FIG. 3.

The intermediate diameter portion 20z of the third piston 20 is supported in a fluid-tight and slidable manner in the bore 1h of the fourth cylinder 1d through a cup-shaped sealing member S3. A cup-shaped sealing member S4 is provided in front of the small diameter portion 20x having an effective cross-sectional area smaller than that of the second piston 12. The small diameter portion 20x is accommodated in a fluid tight and slidable manner in the hollow portion 12b of the second piston 12. Accordingly, a second pressure transmitting chamber R4, which will be described in more detail below, is defined between the inner surface of the hollow portion 12b and the sealing member S4.

As shown in FIG. 3, a first valve mechanism and a second valve mechanism are provided in the third piston 20. The first valve mechanism will be explained first. A plunger 27 is supported in a fluid-tight and slidable manner in the hollow portion 20h of the third piston 20. An axially extending pin 27a is formed integrally with the front end of the plunger 27. An axially elongated hole 27b is formed in the radial direction of the plunger 27. A pin 28 is positioned in and extends through the elongated hole 27b of the plunger 27 and the elongated holes 20s in the intermediate diameter portion 20z of the third piston 20. The pin 28 is positioned in the elongated holes 27b, 20s and is axially movable in the holes over a predetermined distance. The pin 27a passes through the reduced diameter hollow portion 20f and extends into the hollow portion 20e.

A spherical-shaped valve portion 25 and a spring 26 are positioned in front of the pin 27a in the hollow portion 20e. The spherical-shaped valve portion 25 forms a first valve member while the spring 26 forms a first biasing means for biasing the valve portion 25 towards the reduced diameter hollow portion 20f (i.e., to the right as shown in FIG. 3) which forms a first valve seat. The valve portion 25 is thus biased to be seated on the hollow portion 20f. Accordingly, under a condition in which the brake is not operated, when the pin 28 is positioned as shown in FIG. 3, the valve portion 25 is in contact with the pin 27a of the plunger 27 and is separated from the hollow portion or first valve seat 20f. When the pin 28 is positioned at the rear of the elongated holes 20s with the pin 27a being moved backward, the valve portion 25 is seated on the hollow portion or first valve seat 20f. The hollow portion 20e is always connected with the first pressure transmitting chamber R3 through the communicating hole 20r and the groove 12d. When the valve portion 25 is separated from the hollow portion 20f, the hollow portion 20e is connected with the reservoir 4 through the hollow portions 20f, 20g, the elongated holes 20s, the hydraulic chamber R5, the port 1p, and the hydraulic passage 1r. Accordingly, a first hydraulic passage is formed by various elements such as the hollow portion 20f.

The second valve mechanism is provided in the small diameter portion 20x of the third piston 20. As shown in FIG. 3, a plunger 23 has an intermediately located flange portion forming a pressure responsive member which is movably supported in the axial direction within the hollow portion 20c. The rear axially extending end portion of the plunger 23 is slidably supported within the hollow portion 20d of the third piston 20. A pin 23a is formed integrally with the plunger 23 at the front end of the plunger 23. The pin 23a is passes through the reduced diameter or small diameter hollow portion 20b and extends into the hollow portion 20a. A spherical-shaped valve portion 21 and a spring 22 are provided at the front portion of the pin 23a in the hollow portion 20a. The spherical-shaped valve portion 21 forms a second valve member while the spring 22 forms a second biasing means. The spring 22 biases the valve portion 21 toward the hollow portion 20b which forms a second valve seat.

A spring 24 constituting a third biasing means is provided between the flange portion of the plunger 23 and the bottom surface or end of the hollow portion 20c. The plunger 23 is biased toward the valve portion 21 by the spring 24 to separate the valve portion 21 from the hollow portion 20b. The force of the spring 24 is larger than that of the spring 22. Accordingly, as shown in FIG. 3, when the valve portion 21 and the plunger 23 are free, the spring 24 is not compressed and only the spring 22 is compressed. Accordingly, the valve portion 21 is separated from the hollow portion or second valve seat 20b.

The hollow portion 20c is always in communication with the first pressure transmitting chamber R3 through the communicating hole 20q opening rearward of the sealing member S4 and the groove 12d. When the valve portion 21 is separated from the hollow portion 20b, the second pressure transmitting chamber R4 is connected with the first pressure transmitting chamber R3 through the communicating hole 20p and the hollow portions 20a, 20b, and 20c. Accordingly, a second hydraulic passage is formed by elements such as the hollow portion 20p.

Figure 4:
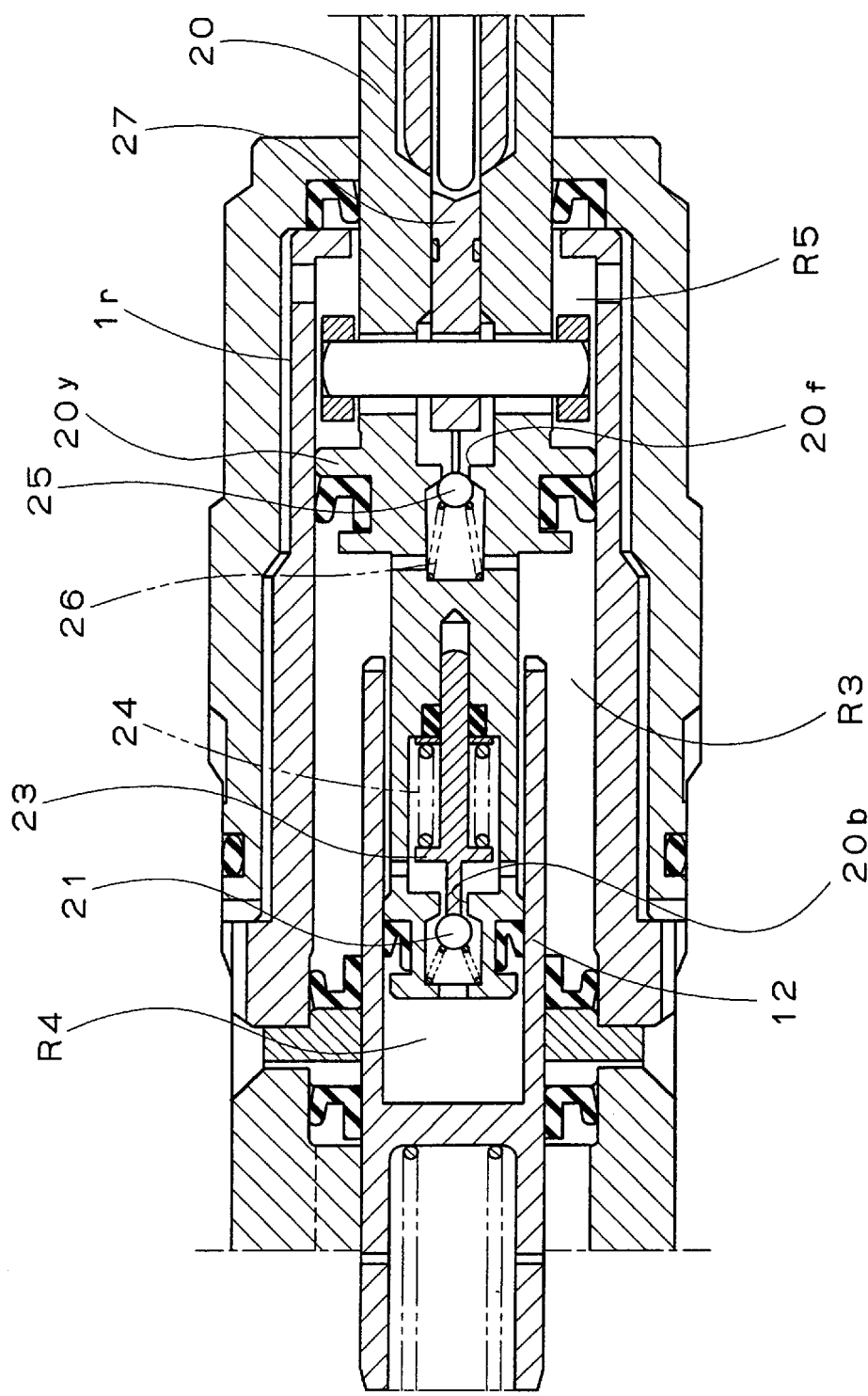
FIG. 4 is a cross-sectional view of the second and the third piston portions under a condition in which an assisting by the negative pressure booster is operated.

With the first and second valve mechanisms constructed as described above, when the brake is not operated as shown in FIGS. 1–3, the first pressure transmitting chamber R3 is connected with the hydraulic passage 1r through the groove 12d, the communicating hole 20r, the hollow portions 20e, 20f, 20g, the elongated holes 20s and the port 1p. Under the brake-operated condition when the third piston 20 moves forward (i.e., the plunger 27 moves backward relative to the third piston 20) by the operation of a negative pressure booster 40, the details of which will be described below, and the valve 25 is in contact with the hollow portion or first valve seat 20f by the force of the spring 26, communication between the first pressure transmitting chamber R3 and the hydraulic passage 1r is interrupted or prevented. Accordingly, when the valve portion 25 is in contact with the hollow portion 20f, the first pressure transmitting chamber R3 forms a hydraulically sealed space filled with brake fluid, and the second piston 12 and the third piston 20 are hydraulically connected. At this time, the effective cross-sectional area of the large diameter portion 20y of the third piston 20 is larger than that of the second piston 12. The second piston 12 moves forward in accordance with the forward movement of the third piston 20 and the volume of the second pressure transmitting chamber R4 increases as shown in FIG. 4. In this condition, the second piston 12 and the third piston 20 move forward.

Figure 5:
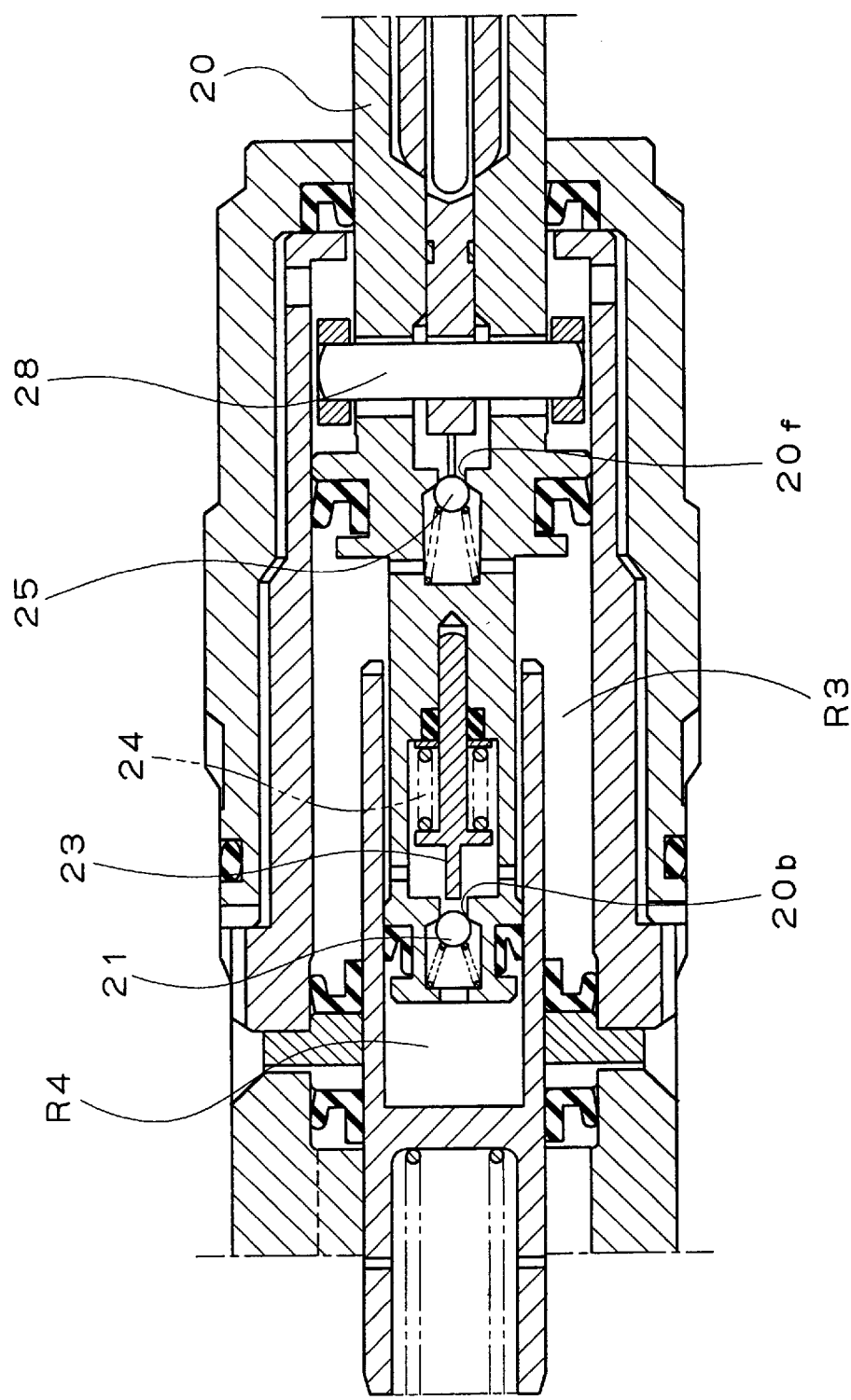
FIG. 5 is a cross-sectional view of the second and the third piston portions under the condition in which further assisting by the negative pressure booster is operated from the condition of FIG. 4.

When the pressure is further increased in the first pressure transmitting chamber R3 beyond a predetermined pressure (the pressure immediately before the assisting limit "dead center" by the negative pressure booster 40), the spring 24 is compressed and the plunger 23 moves backward and the valve portion 21 contacts the hollow portion 20b. Accordingly, as shown in FIG. 5, the second pressure transmitting chamber R4 becomes a hydraulically sealed space filled with brake fluid, and the second piston 12 and the third piston 20 move in this condition.

Figure 6:
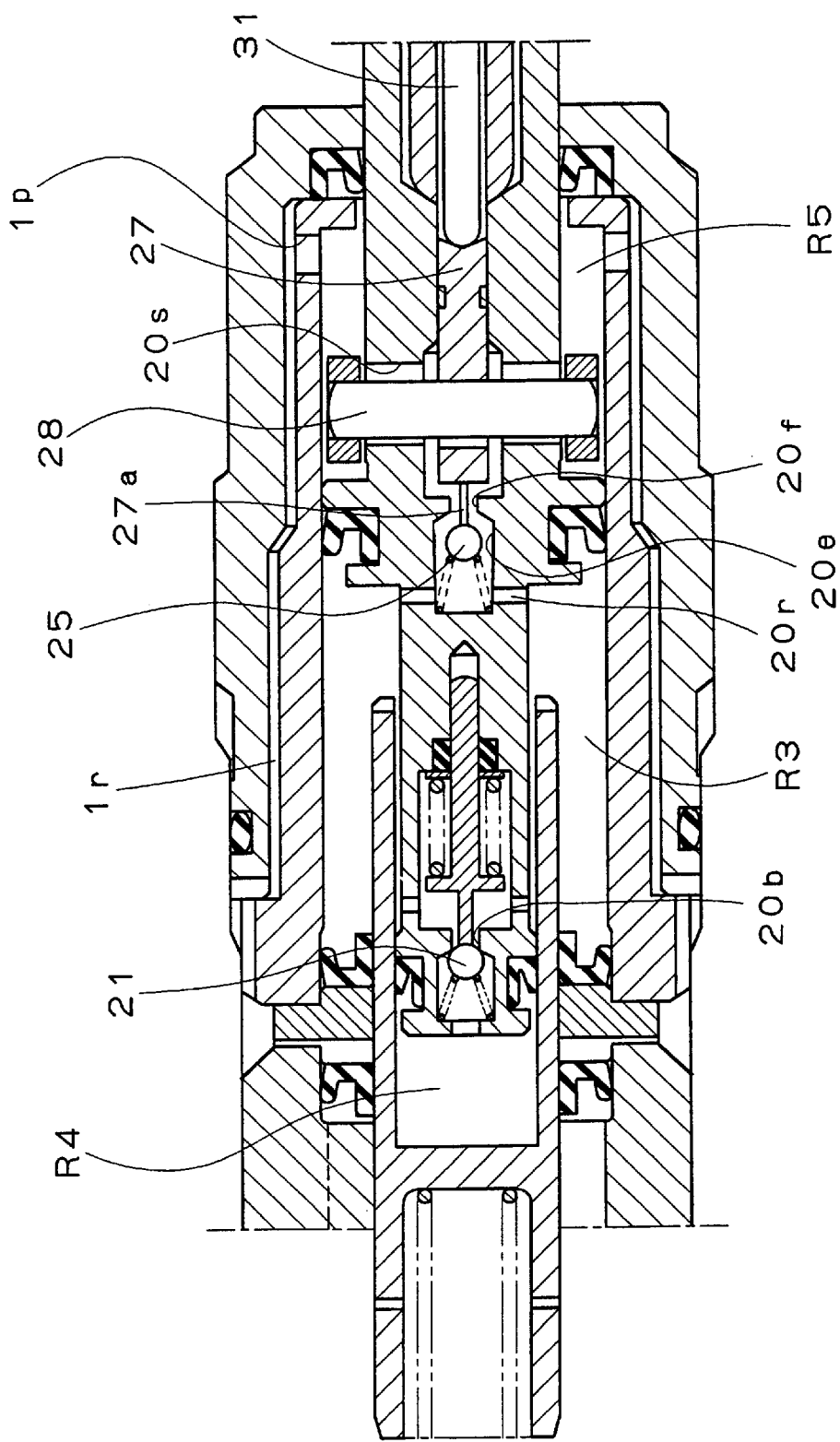
FIG. 6 is a cross-sectional view of the second and the third piston portions under the condition in which the assisting by the negative pressure booster is beyond the assisting limit related to the present invention.

When the brake pedal is further depressed and the hydraulic pressure is increased beyond the assisting limit of the negative pressure booster 40, a first transmitting member 31 moves forward. At this time, the first transmitting member 31 moves forward so that the front end surface of the first transmitting member 31 contacts the rear end surface of the plunger 27 as shown in FIG. 6. As a result, the valve portion 25 is separated from the hollow portion or first valve seat 20f by the pin 27a of the plunger 27. The first pressure transmitting chamber R3 is thus once again connected with the hydraulic passage 1r and the reservoir 4 through the communicating hole 20r, the hollow portions 20e, 20f, 20g, the elongated holes 20s, and the port 1p. The pressure in the first pressure transmitting chamber R3 is thus decreased and reaches an atmospheric pressure level. Accordingly, the plunger 27 is mechanically combined with the third piston 20 through the pin 28, and the pressure force of the plunger 27 is directly transmitted to the third piston 20 through the pin 28. At this time, because the pressure in the second pressure transmitting chamber R4 is higher than that of the first pressure transmitting chamber R3, the valve 21 maintains the condition in which the valve 21 is seated on the hollow portion or second valve seat 20b. The second pressure transmitting chamber R4 maintains the hydraulically sealed space as shown in FIG. 6.

Whereas, as shown in FIG. 3 for instance, in a brake-operated condition under the condition of the third piston 20 being stopped, the plunger 27 is moved forward relative to the third piston 20, the plunger 27 is in contact with the pin 28 shown in right side of FIG. 6. When the plunger 27 is further moved forward, the valve portion 25 is moved forward through the pin 28 and separated from the hollow portion 20f. As shown in the left side of FIG. 3, under the condition of the first pressure transmitting chamber R3 and the second pressure transmitting chamber R4 being in communication with the hydraulic passage 1r, the plunger 27 is mechanically combined with the third piston 20 and the second piston 12 being in contact therewith through the pin 28. The pressure force of the plunger 27 is directly transmitted to the second piston 12 through the pin 28.

Further, as shown in FIGS. 1 and 2, the first transmitting member 31 transmitting the depression force of the brake pedal and a second transmitting member 32 transmitting the driving force by the negative pressure booster 40 are accommodated in the hollow portion 20i at the rear of the third piston 20. The transmitting member 31 and the plunger 27 constitute a brake input transmitting member. The first transmitting member 31 is configured as a rod having a front end in contact with the rear end of the plunger 27 and a rear end operatively connected with a plunger 45 (the details of which will be described more fully below) through a transmitting pin 34 which passes through a reaction force rubber disc 33. The second transmitting member 32 is configured to be operatively connected with a driving member 43 through the reaction force rubber disc 33.

As shown in FIG. 2, the negative pressure booster 40 is provided with a pair of interconnected housings or shells 41a, 41b defining an interior divided by a movable wall 42. A constant pressure chamber (negative pressure chamber) CP is defined forwardly in the interior while a variable pressure chamber VP is defined rearwardly in the interior. The constant pressure chamber CP is connected with a negative pressure source such as the engine intake manifold (not shown) through an inlet to maintain the constant pressure chamber CP under negative pressure.

The movable wall 42 is provided with a pressure receiving plate 42a and a diaphragm 42b. One opening end portion of the cylindrical driving member or power piston 43 is hermetically fixed in the middle of the movable wall 42. The other opening end portion of the driving member 43 extends rearward through the rear housing 41b. The driving member 43 is slidably supported by the opening portion of the rear housing 41b through a sealing member S5 and is enclosed by a boot BT. The boot BT is fixed to an input rod 3 and a communicating hole BTa is formed at the other open end portion of the driving member 43. A spring 44 is disposed between the front end portion of the driving member 43 and the inner surface of the front housing 41a. The movable wall 42 is biased toward the rear housing 41b by the spring 44.

The input rod 3 is provided along the axial central portion in the driving member 43. The forward end portion of the input rod 3 is connected with the plunger 45 through a ball joint. The plunger 45 is slidably supported by an axially extending communicating hole 43a formed in the driving member 43. A valve seat 43b is formed on the periphery of the communicating hole 43a. A first control valve mechanism 46 enclosing the valve seat 43b and biasing an annular valve portion 46a to be seated on the valve seat 43b is configured in the driving member 43. The first control valve mechanism 46 forms a control valve and includes a valve seat 45b at the rear end of the plunger 45. A second control valve mechanism 47 biasing an annular valve portion 47a to be seated on the valve seat 45b is connected with the first control valve mechanism 46. The second control valve mechanism 47 forms an air valve and includes the annular valve portion 47a in front of the cylindrical elastic member. The second control valve mechanism 47 is always biased toward the valve seat 43b by a spring 48a which is supported at its rear end. The rear end of the elastic member configuring the second control valve mechanism 47 is always biased toward the valve seat 43b by a spring 48b and supported by a stepped portion 43c formed inside of the driving member 43.

An annular small diameter portion 45a is formed at the rear of the sliding portion formed on the end of the plunger 45. A key member 49 is engaged with the small diameter portion 45a and is movable over a predetermined distance in the axial direction. The key member 49 extending from the outer periphery of the driving member 43 is engaged with the housing 41b in order to restrict backward axial movement of the plunger 45. Accordingly, the returning position of the movable wall 42 is defined.

A recess portion 43d is formed at the front of the driving member 43. The rear end portion 32b of the second transmitting member 32 is positioned in the recess portion 43d, with a reaction force rubber disc being accommodated between the second transmitting member 32 and the driving member 43. The transmitting pin 34 is in contact with the rear end of the first transmitting member 31. The rear end of the transmitting pin 34 is in contact with the end surface of the plunger 45. The transmitting pin 34 passes through the reaction force rubber disc 33 and is movably supported in the axial direction.

Accordingly, with the negative pressure booster 40 being under the operated condition, when the pushing force of the movable wall 42 is increased to a predetermined value by the pressure increase in the variable pressure chamber VP, the portion of the reaction force rubber disc 33 facing the plunger 45 expands rearward and contacts the end surface of the plunger 45. The reaction force to the rear side in response to a force of the movable wall 42 is added toward the plunger 45. The first control valve mechanism 46 and the second control valve mechanism 47 are controlled in response to a force difference between the reaction force and the operating force added to the input rod 3.

Figure 7:
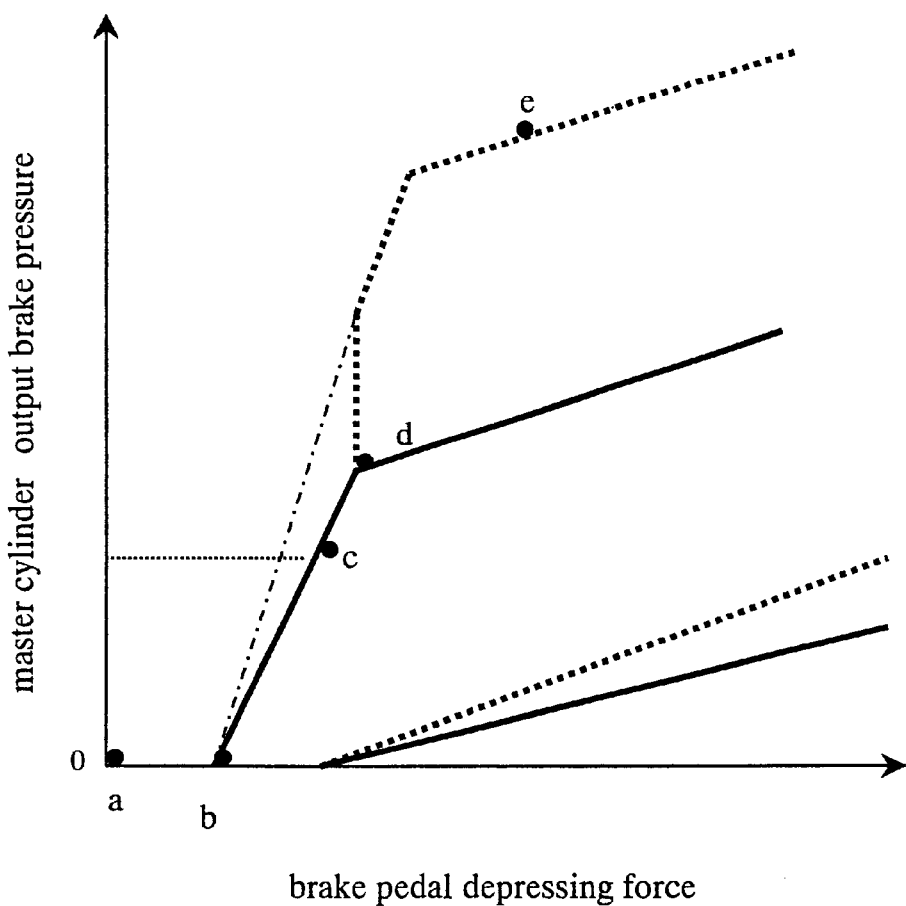
FIG. 7 is a graph showing the input-output performance performed associated with the present invention.

Referring now to FIGS. 1–7, the following is an explanation of the overall operation of the entire hydraulic brake device of the present embodiment. FIGS. 3–6 show the operating conditions of the first and second valve mechanisms and other components related to the hydraulic brake device. FIG. 3 shows the non-operated condition of the device from point "a" to point "b" on the input-output performance graph in FIG. 7. FIG. 4 shows the operated condition of the device from point "b" to point "c". FIG. 5 shows the operated condition from point "c" to point "d". FIG. 6 shows the operated condition from point "d" to point "e". FIG. 7 shows the relationship between the depressing force applied to the brake pedal and the output force (i.e., output brake pressure of the master cylinder 10). The upper solid line shows the performance characteristics when the negative pressure booster 40 is operated, and the lower solid line shows the performance characteristics of the conventional failure. The upper dashed line shows the performance characteristics under a condition in which the assisting by the negative pressure booster extends beyond the assisting limit, and the lower dashed line shows the performance characteristics under failure. In FIG. 7, when the brake pedal force is increased to point "d", the assisting operation by the negative pressure booster 40 reaches its limit.

When the brake pedal is under the non-operated condition, the various components maintain the positions shown in FIGS. 1 and 2. The rear end surface of the second piston 12 is in contact with the front end surface of the large diameter portion 20y of the third piston 20. Also, the first and the second valve devices and the other components maintain the positions shown in FIG. 3. When the negative pressure booster 40 is under the non-operated condition as shown in FIG. 2, the second control valve mechanism 47 closes the valve because the valve portion 47a is in contact with the valve seat 45b. The introduction of atmosphere into the variable pressure chamber VP is thus interrupted. At this time, the first control valve mechanism 46 receives only the negative pressure in the constant pressure chamber CP. When the brake pedal is operated, each member starts the operation. Each member maintains the position as shown in FIG. 3 from point "a" to point "b" in FIG. 7.

When the input rod 3 is pushed forward by the operation of the brake pedal, the valve portion 47a of the second control valve mechanism 47 of the negative pressure booster 40 is eventually separated from the valve seat 45b. When the total of the operating force to the input rod 3 and the pushing force to the input rod 3 caused by the pressure difference between the variable pressure chamber VP and the constant pressure chamber CP becomes larger than the force of the spring 48b, the input rod 3 and the plunger 45 are moved forward. The valve portion 46a of the first control valve mechanism 46 contacts the valve seat 43b of the driving member 43 and the communication between the variable pressure chamber VP and the constant pressure chamber CP is interrupted. Then the valve portion 47a of the second control valve mechanism 47 is separated from the valve seat 45b and the pressure in the variable pressure chamber VP is increased because atmospheric pressure is introduced into the variable pressure chamber VP through the communicating hole BTa of the boot BT. Accordingly, a force biasing or urging the movable wall 42 forward is generated. The third piston 20 and the second piston 12 move forward through the driving member 43, the reaction force rubber disc 33, and the second transmitting member 32. Further, the first piston 11 is moved forward.

In this case, corresponding to the forward movement of the third piston 20, the valve portion 25 is in contact with the hollow portion 20f as shown in FIG. 4, and the first pressure transmitting chamber R3 becomes a hydraulically sealed space. When the third piston 20 is driven forward by the assisting operation of the negative pressure booster 40 under this condition, the pressure moving the valve portion 25 rearward (the pressure toward the hollow portion 20f by the brake pressure in the first pressure transmitting clamber R3 is increased. The valve portion 25 keeps seated on the hollow portion 20f. Then, corresponding to the forward movement of the third piston 20, the volume of the second pressure transmitting chamber R4 is increased as explained above. The volume of a hydraulic chamber R5 at the rear of the large diameter portion 20y of the third piston 20 also increases.

Accordingly, the third piston 20 is hydraulically combined with the second piston 12 through the brake fluid filled in the first pressure transmitting chamber R3 and the second pressure transmitting chamber R4. The third piston 20 and the second piston 12 move forward, and the hydraulic pressure in response to the cross-sectional area of the large diameter portion 20y of the third piston 20 is outputted to wheel cylinders. In this manner, the assisting is carried out by the negative pressure booster 40 and the input-output performance at this stage is shown from point "b" to point "c" in FIG. 7.

When the brake pedal force is increased and the pressure in the first pressure transmitting chamber R3 is further increased beyond the predetermined pressure, the spring 24 is also compressed. Then the plunger 23 moves backward and the valve portion 21 contacts the hollow portion 20b as shown in FIG. 5. Accordingly, the second pressure transmitting chamber R4 becomes an hydraulically sealed space filled with pressure apply brake fluid, and the second piston 12 is hydraulically combined with the third piston 20. The second piston 12 and the third piston 20 move under this condition and the input-output performance at this stage is shown from point "c" to point "d" in FIG. 7.

When the negative pressure booster 40 reaches the assisting limit (point "d" in FIG. 7) and the brake pedal is further depressed, the plunger 45, the transmitting pin 34, and the first transmitting member 31 move forward in response to the forward movement of the input rod 3. As shown in FIG. 6, the front end surface of the first transmitting member 31 is in contact with the rear end surface of the plunger 27 to drive the plunger 27 forward. As a result, the valve portion 25 is separated from the hollow portion or first valve seat 20f by the pin 27a of the plunger 27 and the pressure in the first pressure transmitting chamber R3 is decreased. Accordingly, the plunger 27 is mechanically combined with the third piston 20 through the pin 28 and the biasing force of the plunger 27 is directly transmitted to the third piston 20 through the pin 28. At this time, according to the pressure difference between the second pressure transmitting chamber R4 and the first pressure transmitting chamber R3, the valve portion 21 is kept seated on the hollow portion 20b and the second pressure transmitting chamber R4 is maintained in the hydraulically sealed condition in FIG. 6.

Accordingly, the brake pressure outputted under the condition in which the assisting by the negative pressure booster is beyond the assisting limit is defined by the effective cross-sectional area of the second piston 12 by a combined force of the assisting force of the negative pressure booster and the depression force of the brake pedal. As shown with the dashed line after point "d" in FIG. 7, the smooth input-output performance is shown without generating a sudden change in the brake pedal force. In the absence of the second valve device, when the negative pressure booster 40 reaches the assisting limit as shown in FIG. 6, the pressure in the first and second pressure transmitting chambers R3, R4 become atmospheric pressure. Accordingly, the stroke of the brake pedal is suddenly increased and what is called entrapping of the brake pedal is occurred. According to the described embodiment of the present invention, entrapping of the brake pedal is reliably inhibited or prevented.

When the negative pressure booster 40 fails, the first pressure transmitting chamber R3 is connected with the reservoir 4 through the port 1p, the hydraulic passage 1r, and the port 1j and maintains the atmospheric pressure. When the input rod 3 moves forward in response to the operation of the brake pedal, the third piston 20 is in contact with the second piston 12 and moves forward integrally. In brief, when only the input rod 3 moves forward in response to the operation of the brake pedal without the forward movement of the second transmitting member 32 from the condition shown in FIGS. 1–3, the plunger 27 contacts the pin 28 to push the pin 28 forward. Accordingly, the valve portion 25 is separated from the hollow portion 20f. The first and the second pressure transmitting chambers R3, R4 are connected with the reservoir 4 and become atmospheric pressure just as the pressure in the hydraulic chamber R5.

Accordingly, the third and the second piston 20, 12 are mechanically connected together and move forward integrally. The brake pressure outputted in this case is not defined by the effective cross-sectional area of the large diameter portion 20y of the third piston 20 but by the effective cross-sectional area of the second piston 12. The input-output performance in this condition is shown in FIG. 7 with the lower dashed line. Even when the negative pressure booster 40 fails, a pressure increase gradient can be increased compared to the conventional performance.

As explained above, the hydraulic brake device of the present embodiment, utilizing a relatively simple construction, can smoothly increase the braking force even under a condition in which the assisting by the negative pressure booster is beyond the assisting limit as shown with the upper dashed line in FIG. 7. The proper braking force can thus be obtained. Further, when the negative pressure booster 40 fails, the input-output performance shown as the lower dashed line in FIG. 7 can be obtained. Brief stated, if the negative pressure booster 40 fails, a braking force larger than that associated with the known construction is outputted and the proper braking force can be obtained. Accordingly, one advantage associated with the hydraulic brake device of the present invention is that it is able to ensure braking under emergency conditions. Moreover, the transmitting pin 34 extends forward through the reaction force rubber disc 33 and is in contact with the rear end surface of the first transmitting member 31. Accordingly, the braking operation can be smoothly maintained even when the negative pressure booster 40 fails. In this embodiment, because the first and the second valve devices are provided in the hollow portion of the third piston 20, the manufacturing and assembling can be relatively easily made.

Moreover, if the sealing performance of the sealing members S1, S2 in front and rear of the first pressure transmitting chamber R3 is defective, even if the negative pressure booster 40 is operated, the pressure in the first pressure transmitting chamber R3 cannot be maintained, and the sealing defect can be immediately detected because the third piston 20 is kept in contact with the second piston 12 in this condition. If the sealing performance of the sealing members S1, S2 are defective during the assisting operation by the negative pressure booster 40, the pressure in the first and the second pressure transmitting chambers R3, R4 becomes zero and the third piston 20 comes in contact with the second piston 12 and the stroke of the brake pedal is increased to enable detection of such sealing defect. If the sealing performance of the sealing member S4 at the rear of the second pressure transmitting chamber R4 is defective or fail, the second pressure transmitting chamber R4 is connected with the first pressure transmitting chamber R3 to increase the stroke the brake pedal. Accordingly, the defect of failure of the sealing performance under such condition can also be detected immediately. In this manner, defects in the sealing performance can be detected immediately without providing any additional expensive pressure sensors.

In the described and illustrated embodiment of the present invention, the negative pressure booster 40 is used as the assisting device, but it is to be understood that any other hydraulic pressure assisting device, such as a hydraulic pressure booster or a pressure regulator, can also be used.

The present invention provides a number of advantageous results. For example, when the operation of the master cylinder piston is assisted through the auxiliary piston by the assisting device, the first pressure transmitting chamber is hydraulically sealed by the first valve device. The pressure is increased by connecting the second pressure transmitting chamber with the first pressure transmitting chamber through the second valve device. After the pressure in the first pressure transmitting chamber reaches a predetermined pressure, the second pressure transmitting chamber is hydraulically sealed. When the assisting is not produced by the assisting device, the first pressure transmitting chamber is connected with the reservoir through the first valve device. The second pressure transmitting chamber is connected with the first pressure transmitting chamber through the second valve device. Accordingly, by simply altering the structure of the master cylinder of the known hydraulic pressure brake device, the braking force can be increased smoothly under a condition in which the assisting by the assisting device is beyond the assisting limit. Even when the assisting device fails, the proper input-output performance can be assured.

By virtue of the first and the second valve devices being configured as explained above, the structure of the valve devices can be mechanically formed. With the simple structure, the proper input-output performance can be assured under a condition in which the assisting by the assisting device is beyond the assisting limit and when the assisting device fails. Further, if the sealing performance of the first and the second pressure transmitting chambers is defective, the sealing defect can be detected immediately.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A hydraulic brake device for a vehicle, comprising:
    a master cylinder having a master piston for supplying brake pressure to a wheel cylinder in response to depression of a brake pedal;
    an assisting device for assisting actuation of the master piston in response to the depression of the brake pedal;
    an auxiliary piston provided rearward of the master piston and including a large diameter portion having an effective cross-sectional area larger than that of the master piston and a small diameter portion provided in front of the large diameter portion and having an effective cross sectional area smaller than that of the master piston, the auxiliary piston being operatively associated with assisting operation of the assisting device;
    a first pressure transmitting chamber between the large diameter portion and the master piston;
    a second pressure transmitting chamber between the small diameter portion and the master piston;
    a first valve mechanism for hydraulically closing the first pressure transmitting chamber when actuation of the master piston is assisted by the assisting device through the auxiliary piston and for establishing hydraulic communication between the first pressure transmitting chamber and a reservoir of the master cylinder when the master piston is not actuated by the assisting device; and a second valve mechanism for hydraulically connecting the second pressure transmitting chamber with the first pressure transmitting chamber to increase the brake pressure when the actuation of the master piston is assisted by the assisting device through the auxiliary piston, for hydraulically closing the second pressure transmitting chamber after the pressure in the first pressure transmitting chamber reaches a predetermined value, and for hydraulically connecting the second pressure transmitting chamber with the first pressure transmitting chamber when the master piston is not actuated by the assisting device.

2. The hydraulic brake device according to claim 1, further comprising: a first hydraulic passage formed in the auxiliary piston for connecting the first pressure transmitting chamber with the reservoir; the first valve mechanism including a first valve seat disposed in the first hydraulic passage, a first valve body adapted to be alternatively seated on and separated from the first valve seat for alternatively closing and opening the first hydraulic passage, a first biasing means always biasing the first valve body toward the first valve seat, and a brake input transmitting member for moving the first valve body in response to the depression of the brake pedal when the assisting device is not operated.

3. The hydraulic brake device according to claim 2, further comprising: a second hydraulic passage formed in the auxiliary piston for connecting the second pressure transmitting chamber with the first pressure transmitting chamber;

the second valve mechanism including a second valve seat disposed in the second hydraulic passage, a second valve body adapted to be alternatively seated on and separated from the second valve seat for alternatively closing and opening the second hydraulic passage, a second biasing means always biasing the second valve body toward the second valve seat, a pressure responsive member for moving the second valve body in a direction separated from the second valve seat in response to the pressure in the first pressure transmitting chamber, and a third biasing means for always biasing the pressure responsive member toward the second valve body with a biasing force larger than that of the second biasing means.

4. The hydraulic brake device according to claim 2, wherein the brake input transmitting member is adapted to contact a plunger, and including a pin passing through a hole in the plunger and passing through holes in the auxiliary piston.

5. The hydraulic brake device according to claim 2, wherein the assisting device includes a reaction member, and including a transmitting pin extending through the reaction member and being movable relative to the reaction member to contact the brake input transmitting member in response to the depression of the brake pedal when the assisting device is not operated.

6. The hydraulic brake device according to claim 1, including a hydraulic passage formed in the auxiliary piston for connecting the second pressure transmitting chamber with the first pressure transmitting chamber;

the second valve mechanism including a valve seat disposed in the hydraulic passage, a valve body adapted to be alternatively seated on and separated from the valve seat for alternatively closing and opening the hydraulic passage, a spring always biasing the valve body toward the valve seat, a pressure responsive member for moving the valve body in a direction separated from the valve seat in response to the pressure in the first pressure transmitting chamber, and biasing means for always biasing the pressure responsive member toward the valve body with a biasing force larger than that of the spring.

7. The hydraulic brake device according to claim 1, including a hydraulic passage formed in the auxiliary piston for connecting the second pressure transmitting chamber with the first pressure transmitting chamber;

the second valve mechanism including a valve seat disposed in the hydraulic passage and a valve body adapted to be alternatively seated on and separated from the valve seat for alternatively closing and opening the hydraulic passage.

8. The hydraulic brake device according to claim 7, wherein the second valve mechanism also includes a pressure responsive member for moving the valve body in a direction separated from the valve seat in response to the pressure in the first pressure transmitting chamber, and a spring for always biasing the pressure responsive member toward the valve body.

9. The hydraulic brake device according to claim 1, wherein the assisting device is a negative pressure booster that includes a housing having an interior divided by a movable wall into a constant pressure chamber and a variable pressure chamber.

10. A hydraulic brake device for a vehicle, comprising:

a master cylinder having a master piston for supplying brake pressure to a wheel cylinder in response to depression of a brake pedal;

an assisting device for assisting actuation of the master piston in response to the depression of the brake pedal;

an auxiliary piston provided rearward of the master piston and including a larger diameter portion and a smaller diameter portion provided in front of the larger diameter portion, the auxiliary piston being operatively associated with assisting operation of the assisting device;

a first pressure transmitting chamber between the larger diameter portion and the master piston;

a second pressure transmitting chamber between the smaller diameter portion and the master piston;

a first valve mechanism for hydraulically closing the first pressure transmitting chamber when actuation of the master piston is assisted by the assisting device through the auxiliary piston and for establishing hydraulic communication between the first pressure transmitting chamber and a reservoir when the master piston is not actuated by the assisting device; and a second valve mechanism for hydraulically connecting the second pressure transmitting chamber with the first pressure transmitting chamber when the master piston is not actuated by the assisting device.

11. The hydraulic brake device according to claim 10, wherein the second valve mechanism hydraulically connects the second pressure transmitting chamber with the first pressure transmitting chamber to increase the brake pressure when the actuation of the master piston is assisted by the assisting device through the auxiliary piston.

12. The hydraulic brake device according to claim 10, wherein the second valve mechanism hydraulically closes the second pressure transmitting chamber after the pressure in the first pressure transmitting chamber reaches a predetermined value.

13. The hydraulic brake device according to claim 10, further comprising: a first hydraulic passage formed in the auxiliary piston for connecting the first pressure transmitting chamber with the reservoir; the first valve mechanism including a first valve seat disposed in the first hydraulic passage, a first valve body adapted to be alternatively seated on and separated from the first valve seat for alternatively closing and opening the first hydraulic passage, first biasing means always biasing the first valve body toward the first valve seat, and a brake input transmitting member for moving the first valve body in response to the depression of the brake pedal when the assisting device is not operated.

14. The hydraulic brake device according to claim 13, further comprising: a second hydraulic passage formed in the auxiliary piston for connecting the second pressure transmitting chamber with the first pressure transmitting chamber;

the second valve mechanism including a second valve seat disposed in the second hydraulic passage, a second valve body adapted to be alternatively seated on and separated from the second valve seat for alternatively closing and opening the second hydraulic passage, a second biasing means always biasing the second valve body toward the second valve seat, a pressure responsive member for moving the second valve body in a direction separated from the second valve seat in response to the pressure in the first pressure transmitting chamber, and a third biasing means for always biasing the pressure responsive member toward the second valve body with a biasing force larger than that of the second biasing means.

15. The hydraulic brake device according to claim 13, wherein the brake input transmitting member is adapted to contact a plunger, and including a pin passing through a hole in the plunger and passing through holes in the auxiliary piston.

16. The hydraulic brake device according to claim 13, wherein the assisting device includes a reaction member, and including a transmitting pin extending through the reaction member and being movable relative to the reaction member to contact the brake input transmitting member in response to the depression of the brake pedal when the assisting device is not operated.

17. The hydraulic brake device according to claim 10, including a hydraulic passage formed in the auxiliary piston for connecting the second pressure transmitting chamber with the first pressure transmitting chamber;

the second valve mechanism including a valve seat disposed in the hydraulic passage, a valve body adapted to be alternatively seated on and separated from the valve seat for alternatively closing and opening the hydraulic passage, a spring always biasing the valve body toward the valve seat, a pressure responsive member for moving the valve body in a direction separated from the valve seat in response to the pressure in the first pressure transmitting chamber, and biasing means for always biasing the pressure responsive member toward the valve body with a biasing force larger than that of the spring.

18. The hydraulic brake device according to claim 10, wherein the assisting device is a negative pressure booster that includes a housing having an interior divided by a movable wall into a constant pressure chamber and a variable pressure chamber.

19. A hydraulic brake device for a vehicle, comprising:

a master cylinder having a master piston for supplying brake pressure to a wheel cylinder in response to depression of a brake pedal;

an assisting device for assisting actuation of the master piston in response to the depression of the brake pedal;

an auxiliary piston provided rearward of the master piston and including a larger diameter portion and a smaller diameter portion provided in front of the larger diameter portion, the auxiliary piston being operatively associated with assisting operation of the assisting device;

a first pressure transmitting chamber between the larger diameter portion and the master piston;

a second pressure transmitting chamber between the smaller diameter portion and the master piston;

a first valve mechanism for hydraulically closing the first pressure transmitting chamber when actuation of the master piston is assisted by the assisting device through the auxiliary piston and for establishing hydraulic communication between the first pressure transmitting chamber and a reservoir when the master piston is not actuated by the assisting device;

a hydraulic passage formed in the auxiliary piston for connecting the second pressure transmitting chamber with the first pressure transmitting chamber;

valve seat disposed in the hydraulic passage;

a valve body adapted to be alternatively seated on and separated from the valve seat for alternatively closing and opening the hydraulic passage; and a spring always biasing the valve body toward the valve seat.

20. The hydraulic brake device according to claim 19, wherein said spring is a first spring, and including a pressure responsive member for moving the valve body in a direction separated from the valve seat in response to the pressure in the first pressure transmitting chamber, and a second spring always biasing the pressure responsive member toward the valve body with a biasing force larger than that of the first spring.

* * * * *